UNITED STATES PATENT OFFICE.

JAMES WRIGHT MACFARLANE, OF GLASGOW, SCOTLAND.

APPARATUS FOR GOVERNING FLUID-PRESSURE IMPULSE-MOTORS.

SPECIFICATION forming part of Letters Patent No. 726,175, dated April 21, 1903.

Application filed October 28, 1902. Serial No. 129,131. (No model.)

*To all whom it may concern:*

Be it known that I, JAMES WRIGHT MACFARLANE, a subject of the King of Great Britain and Ireland, and a resident of Kingston, in the county of Glasgow, Scotland, (whose postal address is 98 Dundas street, Kingston, in the county of Glasgow, Scotland,) have invented Improvements in Apparatus for Governing Fluid-Pressure Impulse-Motors, (for which I have applied for a British patent, No. 21,774, dated October 7, 1902,) of which the following is a specification.

My said invention has for its object to improve apparatus for governing fluid-pressure impulse-motors—such, for example, as what are known as "Pelton" wheels—so that while such governing device will be simple and of comparatively inexpensive construction it will act in an efficient and satisfactory manner in regulating the speed of the motor. In such motors a jet of fluid under pressure acts on cups or vanes arranged around a wheel on a shaft from which the power generated is transmitted by any suitable gearing, and according to my invention the movement of the usual conical plunger for constricting the area of the jet-orifice when the speed of the motor becomes excessive and governing becomes necessary is accomplished by providing a valve operated by a governor to control an outlet from a chamber to which the pressure fluid has access by leakage and in which a piston part carrying such plunger works. The valve controls the escape of leakage from such chamber, so that the pressure of the fluid in such chamber is determined according to the speed of the motor and so that such pressure with or without the assistance of a spring also determines the movements of the constricting-plunger. The governor operating the leakage-controlling valve may be of the improved construction hereinafter described, or it may be of any suitable known type.

In order that my said invention and the manner of performing the same may be properly understood, I have hereunto appended six sheets of explanatory drawings, to be hereinafter referred to in particularly describing my improvements.

Figure 1:
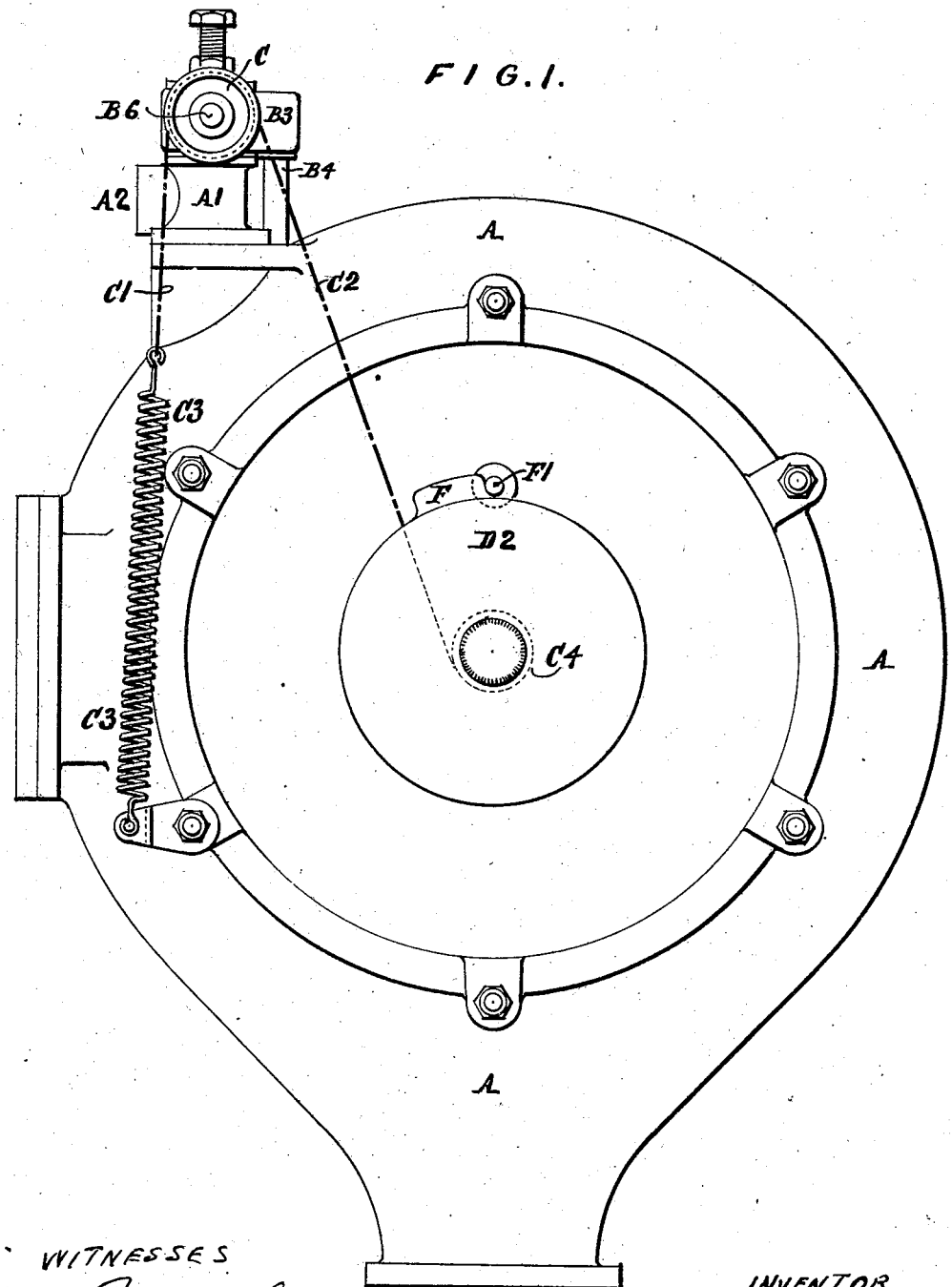
Figure 2:
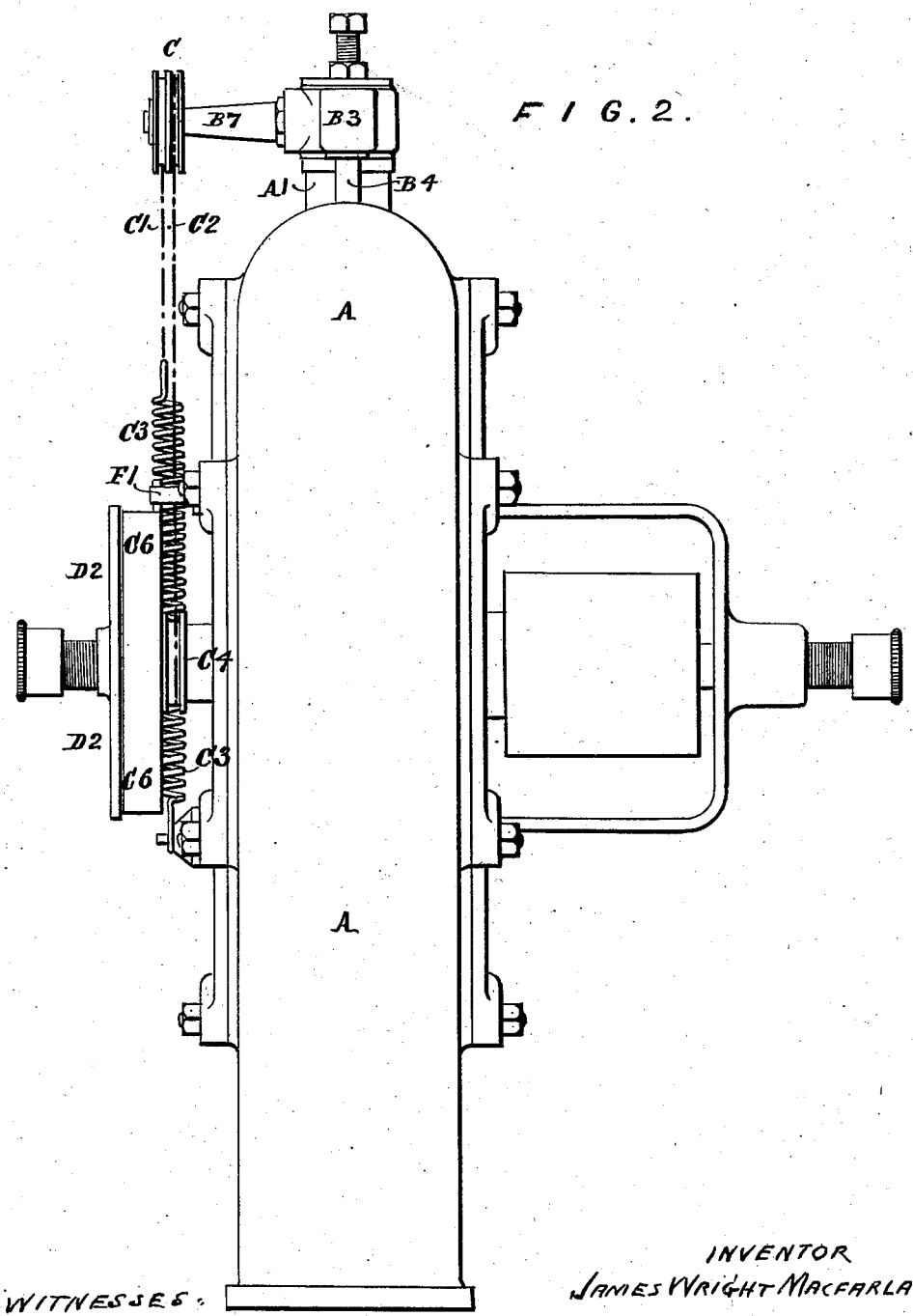
Figure 3:
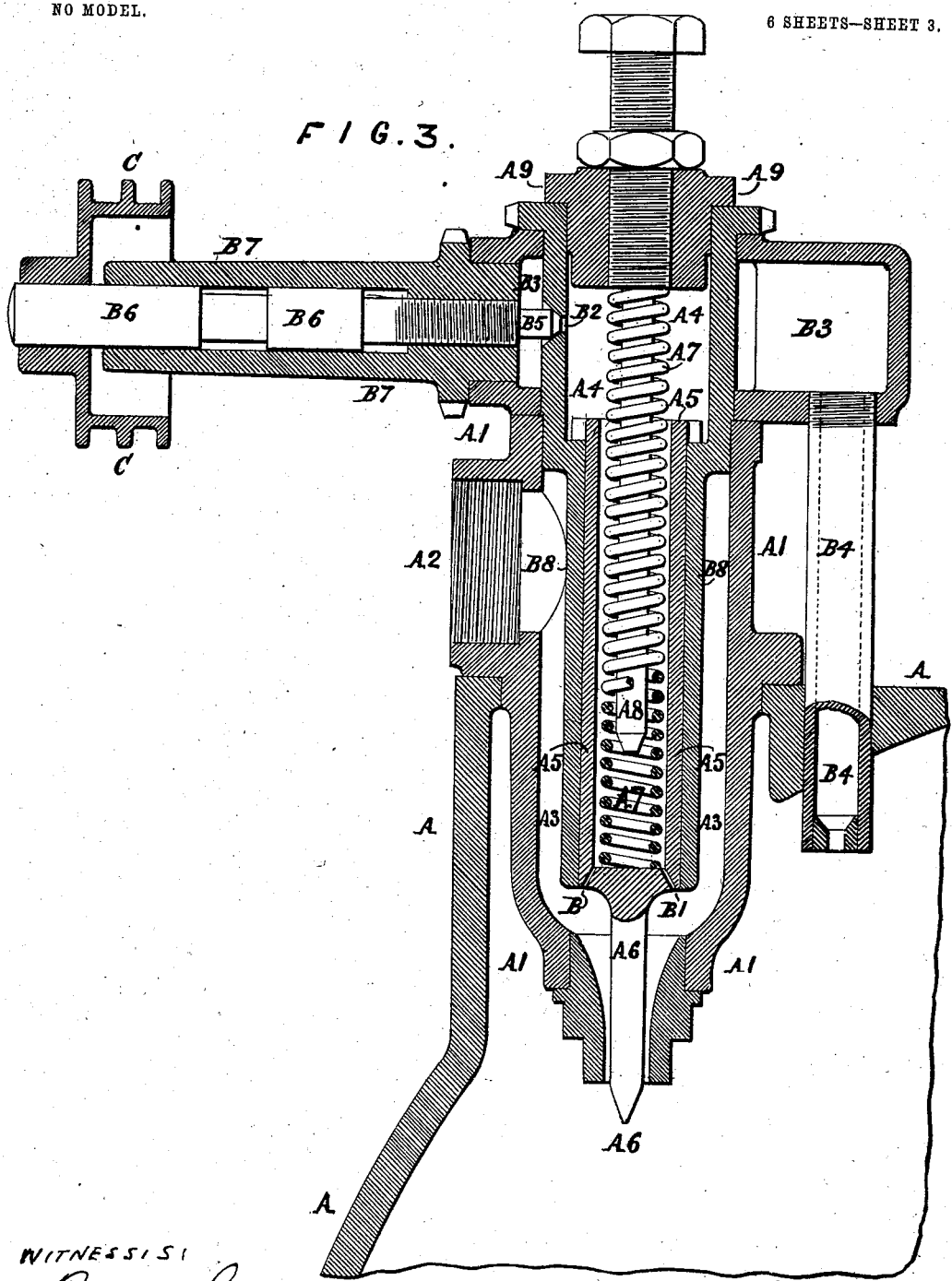
Figure 4:
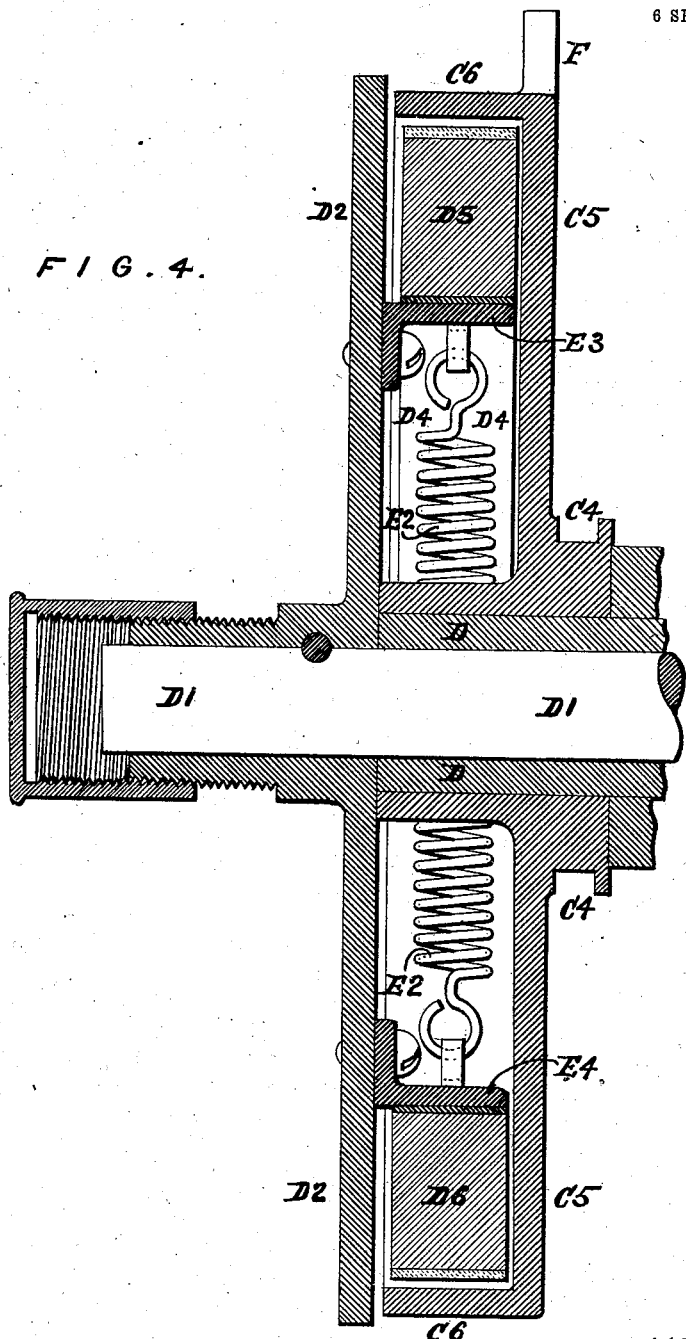
Figure 5:
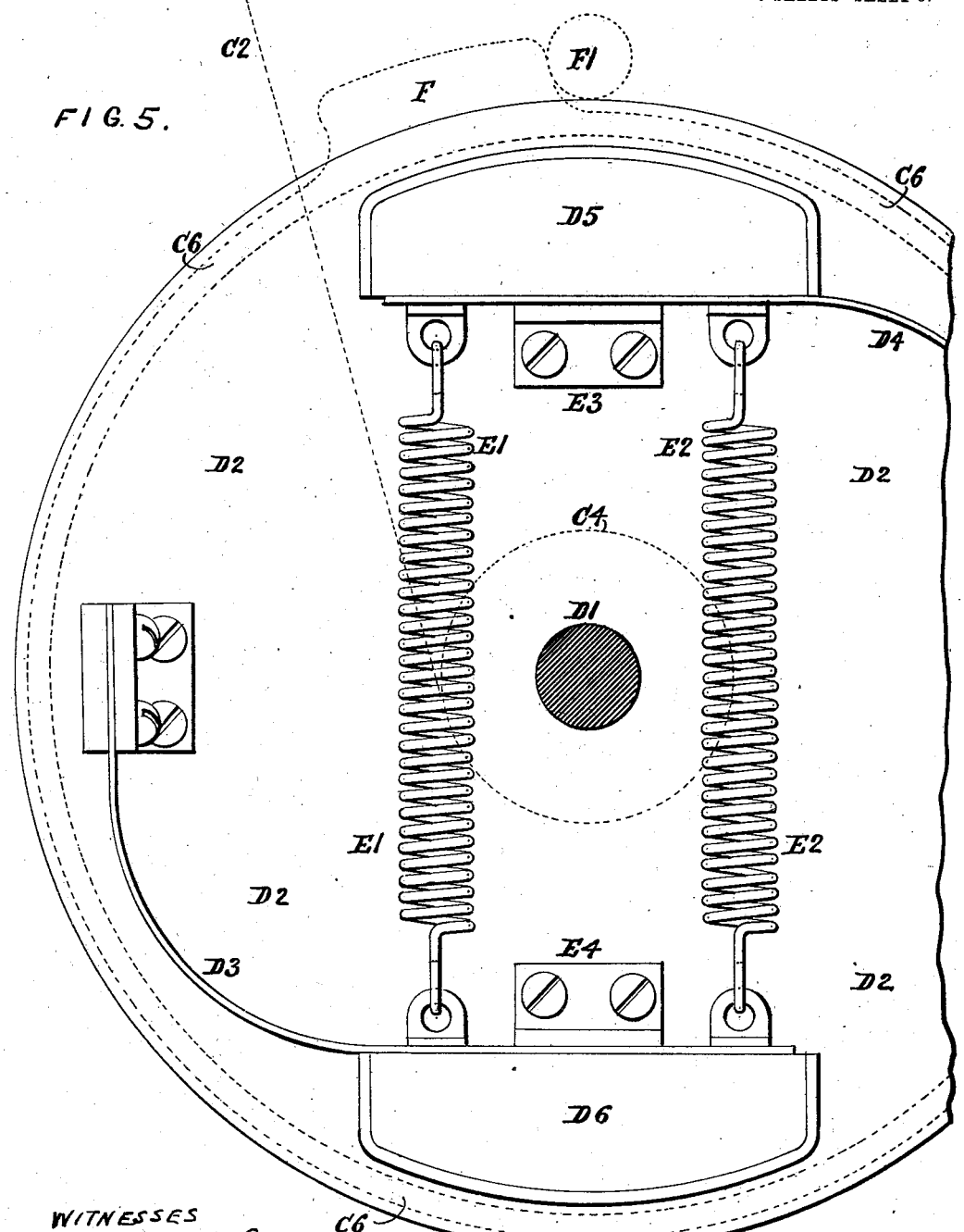
Figure 6:
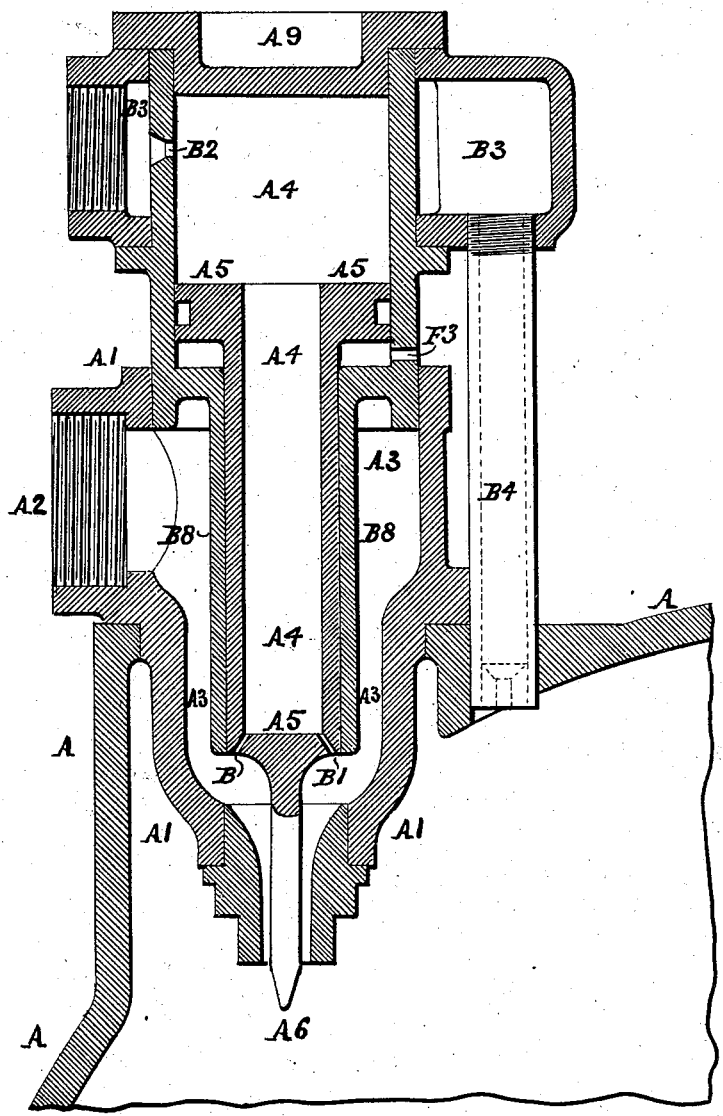

Figures 1 and 2 are elevations, as at right angles to each other, showing the application of my improvements in connection with a Pelton wheel. Fig. 3 is a vertical section, drawn to a larger scale, showing the jet-nozzle part and constricting-plunger of such motor as made with the controlling device. Figs. 4 and 5 are vertical sections, as at right angles to each other, of the improved form of governor provided to operate the controlling device. Fig. 6 is a vertical section showing a slight variation of the controlling device.

In the drawings the same reference-letters are used to mark the same or like parts wherever they are repeated.

As shown in Figs. 1 to 5 of the drawings, the motor A is made with a jet-nozzle part A', projecting more or less into the casing of the motor and to which the fluid under pressure has access by an opening $A^2$. A tube $B^8$ is secured within the nozzle part A', dividing it into two chambers $A^3 A^4$, within the inner one of which there works a piston part $A^5$, carrying the usual conical constricting-plunger $A^6$, used for constricting the area of the jet-orifice when governing becomes necessary, as is well understood, this plunger $A^6$ being shown in its lowest position in Fig. 3. The plunger-piston $A^5$ is hollow and has within it a spring $A^7$, guided on a rod $A^8$, extending down from a cap $A^9$, closing the upper end of the inner chamber $A^4$, the lever end of the rod $A^8$ also serving as a stop to limit the travel of the piston $A^5$ when moved up, as hereinafter described. By-pass ports B B' are formed through the lower end of the plunger-piston $A^5$, so that a certain determined leakage of the pressure fluid will take place into the inner chamber $A^4$, the fluid thus entering the chamber passing off, as hereinbefore described, from its upper end by an outlet $B^2$, communicating with a chamber $B^3$, surrounding the upper end of the chamber $A^4$ and connected by a drain-pipe $B^4$ with the interior of the motor-casing. If desired, the by-pass ports B B' may be dispensed with, the leakage of the pressure fluid into the inner chamber $A^4$ taking place by making the plunger-piston $A^5$ a loose fit in the tube $B^8$, and the fluid will in this case pass up between the piston and the tube. The outlet $B^2$ is controlled by a valve $B^5$ on the end of a rod or spindle $B^6$, externally screwed to work in an internal screw in a tube $B^7$, one end of which is secured in an opening formed through the side of the chamber $B^3$, this tube $B^7$ being shown in Fig. 3 in the same plane as the drain-pipe $B^4$ for clearness in the drawings. The end of the rod $B^6$, which projects beyond the outer end of the tube $B^7$, within which it works, has secured on it a pulley C, to which is attached chains or cords $C'$ $C^2$, extending one, $C'$, from a spring $C^3$, secured to the motor-casing, (or a weight and dash-pot may be used instead of a spring,) and the other, $C^2$, from a centrifugal governor, which consists of a pulley part $C^4$, to which the chain is attached and which is on a disk $C^5$, made with a rim or flange $C^6$. This disk $C^5$ and the pulley part $C^4$ is loose on a sleeve or bearing D, carrying one end of the motor-shaft $D'$. On the end of the shaft $D'$ projecting beyond the rim $C^6$ of the disk $C^5$ there is keyed a second disk $D^2$, which has secured to its inner face one end of each of two blade-springs $D^3$ $D^4$, the opposite ends of which carry weighted friction-blocks $D^5$ $D^6$. These blocks are shaped to suit the inner circumference of the flanged disk $C^5$ $C^6$; but they are kept from bearing on same by springs $E'$ $E^2$, stretching between them and of sufficient power to pull them inward and hold them against stops $E^3$ $E^4$, fixed to the disk $D^2$, when the motor is running normally.

When it is desired to start the motor A, the presure fluid is admitted by the opening $A^2$ to the outer chamber $A^3$ of the nozzle part $A'$, and as the area of the lower end of the piston part $A^5$ is larger than that of the conical constricting-plunger $A^6$ the piston is forced upward against the action of the spring $A^7$, thus gradually withdrawing the plunger. When the bottom of the piston is bearing on the lower end of the rod $A^8$, the plunger will then be so far withdrawn that the full jet of pressure fluid will pass through the orifice. At the same time a small percentage of the pressure fluid is leaking, as hereinbefore described, either through the by-pass ports B $B'$ or up between the piston $A^5$ and tube $B^8$ into the inner chamber $A^4$, and as the outlet $B^2$ is fully open when the motor is running normally the fluid thus entering the chamber $A^4$ is at the same time passing off by this outlet and escaping by the drain-pipe $B^4$. If, however, from any cause the speed of the motor should become excessive, the increased centrifugal action will force the weighted friction-blocks $D^5$ $D^6$ of the governor outward (against the action of the springs) and cause them to bear against the inner circumference of the flange $C^6$ of the disk $C^5$. This disk $C^5$ will then begin to revolve and to wind the chain $C^2$ onto the pulley part $C^4$, causing a corresponding revolution of the pulley C on the end of the screwed rod $B^6$, which in turn will wind up the chain $C'$ and distend the spring $C^3$, the pull of which thus prevents too sudden action of the friction-blocks $D^5$ $D^6$. This action of the governor by turning the pulley C on the end of the screwed rod $B^6$ causes that rod to be screwed inward in its tube $B^7$, and the valve $B^5$ will consequently then more or less close the outlet $B^2$. This will restrict or stop the leakage of pressure fluid hereinbefore described and raise the pressure in the inner chamber $A^4$. When the pressure is equal in both the outer and inner chambers $A^3$ $A^4$, and the piston $A^5$ is therefore in equilibrium, the spring $A^7$ will force the piston down, so that the constricting-plunger $A^6$ will project into the nozzle-orifice, and thus alter the size of the jet of pressure fluid, and the motor will slow down. When the motor is again beginning to run normally and the excessive centrifugal action has ceased, the friction-blocks $D^5$ $D^6$ will be pulled inward by the springs $E'$ $E^2$. This frees the flanged disk $C^5$ $C^6$, and the action of the spring $C^3$ will then rotate that disk, the pulley C, and the screwed rod $B^6$ in the opposite direction, so as to again withdraw the valve $B^5$ from the outlet $B^2$. The pressure can then act, as hereinbefore described, to again force up the piston $A^5$ and withdraw the constricting-plunger $A^6$ from the jet-orifice. A stop F on the disk $C^5$, encountering a fixed pin $F'$, prevents that disk being turned farther than is necessary in either direction.

As shown in Fig. 6, the spring $A^7$ can be dispensed with, the movement of the piston part $A^5$ being effected by making the upper side of that piston of considerably larger area than the lower projecting end and making the piston part work water-tight in the tube $B^8$. In this modification by-pass ports B $B'$ must be used for the leakage of the pressure fluid, and a small opening $F^3$ may be formed through the chamber $A^4$, direct or with the chamber $B^3$ or pipe $B^4$, to permit of easy movement of the piston therein and also to act as an outlet for any pressure fluid which may leak past the plunger-piston $A^5$.

I claim as my invention—

1. In a fluid-pressure impulse-motor the speed of which is governed by regulating the jet of pressure fluid, a constricting-plunger, a piston part carrying the plunger part, a chamber in which the said piston part works, means allowing leakage through said chamber, a valve controlling this leakage and a governor to operate the valve, whereby the pressure in such chamber is determined according to the speed of the motor, and such pressure also determines the movements of the constricting-plunger, substantially as described.

2. In apparatus for governing fluid-pressure impulse-motors, two concentric chambers within the nozzle part, to which the fluid under pressure has access, a piston-plunger and a spring within the inner chamber, means to permit leakage of the pressure fluid into this inner chamber, a valve to control the escape of this leakage from such chamber, and a governor to operate said valve, substantially as described.

3. In apparatus for governing fluid-pressure impulse-motors, two chambers within the nozzle part to which the fluid under pressure has access, a piston part within the inner chamber and carrying the plunger, the upper side of this piston part being of larger area than the under side, a by-pass part formed through the piston to permit leakage of the pressure fluid into the inner chamber, a valve to control the escape of this leakage from such chamber, a governor to control said valve, and an opening leading from the lower end of the inner chamber to the atmosphere, substantially as described.

4. A nozzle for fluid-pressure impulse-motors in combination with a constricting-plunger, means for allowing a part of the pressure fluid to leak past the plunger and a governing means to regulate such leakage, both means acting together to control the position of the constricting-plunger in the nozzle, as and for the purpose described.

5. A governing-nozzle for fluid-pressure impulse-motors, comprising a constricting-plunger and a chamber for said plunger, communicating passages from the nozzle to the chamber, an outlet from the latter, and means to more or less open said outlet, substantially as described.

6. A governing-nozzle for fluid-pressure impulse-motors, comprising a constricting-plunger, a chamber and a spring for said plunger, an inlet and communicating passages from the inlet to the chamber, an outlet from the latter and means to more or less open said outlet, substantially as described.

In testimony whereof I have signed my name to this specification in the presence of two subscribing witnesses.

JAMES WRIGHT MACFARLANE.

Witnesses:
　DAVID FERGUSON,
　GEORGE PATTERSON.